(12) United States Patent
Dunko

(10) Patent No.: US 8,996,633 B2
(45) Date of Patent: Mar. 31, 2015

(54) SYSTEMS FOR PROVIDING EMOTIONAL TONE-BASED NOTIFICATIONS FOR COMMUNICATIONS AND RELATED METHODS

(75) Inventor: Gregory A. Dunko, Cary, NC (US)

(73) Assignee: HTC Corporation, Taoyuan, Taoyuan County (TW)

(*) Notice: Subject to any disclaimer, the term of this patent is extended or adjusted under 35 U.S.C. 154(b) by 262 days.

(21) Appl. No.: 13/585,271

(22) Filed: Aug. 14, 2012

(65) Prior Publication Data

US 2014/0052792 A1    Feb. 20, 2014

(51) Int. Cl.
- *G06F 15/16* (2006.01)
- *G10L 25/63* (2013.01)
- *H04M 1/725* (2006.01)
- *H04W 4/16* (2009.01)

(52) U.S. Cl.
CPC ............ *G10L 25/63* (2013.01); *H04M 1/72547* (2013.01); *H04W 4/16* (2013.01)
USPC ........... 709/206; 455/466; 345/156; 704/270; 715/753

(58) Field of Classification Search
CPC ..... G10L 25/63; H04W 4/01; H04L 41/0631; H04L 51/04
USPC .......... 709/206; 455/466; 345/156; 704/270; 715/753
See application file for complete search history.

(56) References Cited

U.S. PATENT DOCUMENTS

| | | | |
|---|---|---|---|
| 8,036,361 B2 * | 10/2011 | Batni et al. ............... | 379/210.01 |
| 2001/0042057 A1 * | 11/2001 | Ikebe et al. ..................... | 706/11 |
| 2003/0110450 A1 * | 6/2003 | Sakai ............... | 715/529 |
| 2004/0147814 A1 * | 7/2004 | Zancho et al. ................ | 600/300 |
| 2005/0143103 A1 * | 6/2005 | Bjorgan et al. ............... | 455/466 |
| 2010/0223341 A1 * | 9/2010 | Manolescu et al. .......... | 709/206 |
| 2012/0198357 A1 * | 8/2012 | Tozzi ............................ | 715/753 |
| 2013/0151257 A1 * | 6/2013 | MacMannis et al. ......... | 704/270 |
| 2013/0328763 A1 * | 12/2013 | Latta et al. .................... | 345/156 |
| 2014/0052792 A1 * | 2/2014 | Dunko .......................... | 709/206 |
| 2014/0118257 A1 * | 5/2014 | Baldwin ....................... | 345/158 |

* cited by examiner

*Primary Examiner* — Michael C Lai
(74) *Attorney, Agent, or Firm* — McClure, Qualey & Rodack, LLP

(57) ABSTRACT

Systems for providing emotional tone-based notifications for communications and related methods are provided. In this regard, a representative system includes an electronic device having a network/communication interface operative to facilitate communication over a networked environment. The electronic device is operative to automatically associate information corresponding to an emotional tone of the communication with the communication such that a recipient of the communication is informed of the emotional tone.

19 Claims, 5 Drawing Sheets

US 8,996,633 B2

SYSTEMS FOR PROVIDING EMOTIONAL TONE-BASED NOTIFICATIONS FOR COMMUNICATIONS AND RELATED METHODS

TECHNICAL FIELD

The present disclosure generally relates to communications from electronic devices.

BACKGROUND

A user of a mobile device may receive many different types of alerts associated with events, such as phone calls, social network updates, emails, text messages, etc. Typically, the user is notified of an event by an alert (e.g., a sound and/or vibration emitted by the mobile device). These alerts may be provided based on default settings of the device and/or may be preconfigured by the user to identify the type of event. For example, a user may select one type of alert for an incoming text message and another type for incoming email.

SUMMARY

Systems for providing emotional tone-based notifications for communications and related methods are provided. Briefly described, one embodiment, among others, is a system comprising: an electronic device having a network/communication interface operative to facilitate communication over a networked environment; the electronic device being operative to automatically associate information corresponding to an emotional tone of the communication with the communication such that a recipient of the communication is informed of the emotional tone.

Another embodiment is a computer-readable medium having stored thereon computer-executable instructions for performing method steps comprising: receiving information at an electronic device corresponding to a communication; and automatically associating information corresponding to an emotional tone of the communication with the communication such that a recipient of the communication is informed of the emotional tone.

Another embodiment is a method for providing emotional tone-based notifications for communications comprising: receiving information at an electronic device corresponding to a communication; and automatically associating, via the electronic device, information corresponding to an emotional tone of the communication with the communication such that a recipient of the communication is informed of the emotional tone.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
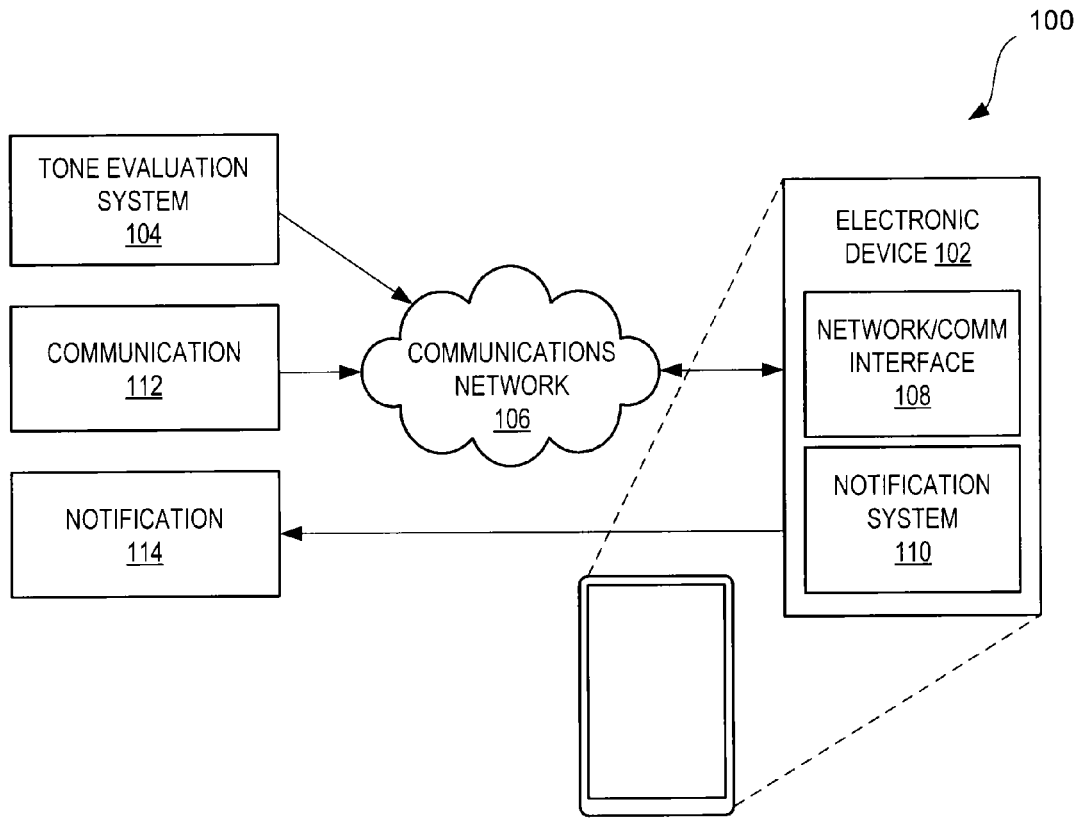
FIG. 1 is a schematic diagram of an example embodiment of a system for providing emotional tone-based notifications for communications.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

In this regard, systems for providing emotional tone-based notifications for communications and related methods are provided. In some embodiments, the emotional tone of a communication (e.g., a text message, video clip, photograph, an instant message or an email message) received at an electronic device is determined, and a notification is provided to the user of the electronic device (e.g., a smartphone). By way of example, the notification may be a visual notification that is displayed to the user, haptic/vibration based and/or an audible notification. Visual examples might include LED or other lighting effects, or other visual indications (e.g. "!!!").

Such a notification is in contrast to a preconfigured alert (such as an importance indicator) that a sender may associate with a communication, in that the determination of the emotional tone of the communication is not selected by the sender. Additionally, such a notification is in contrast to an identification indicator that a user of the electronic device may designate based on the type of communication, in that the emotional tone provides information that is distinct from the type of communication.

In some embodiments, the determination of the emotional tone is performed by the electronic device receiving the communication, whereas in other embodiments the determination may be made remotely. It should also be noted that the emotional tone may be derived from the communication itself and/or from an analysis of the sender of the communication. By way of example, as a user is composing a communication with an electronic device, a camera of the electronic device may be used capture one or more images of the user. The images may then be evaluated to determine the emotional state of the user, such as by using facial recognition techniques. This information may be correlated with an emotional tone that may be associated with the communication.

FIG. 1 is a schematic diagram of an example embodiment of a system for providing emotional tone-based notifications for communications. As shown in FIG. 1, system 100 includes an electronic device 102 and a tone evaluation system 104 that communicate via a communications network 106. It should be noted that communications network 106 may comprise one or more wired and/or wireless networks that may use one or more communication protocols.

Electronic device 102 (e.g., a mobile device) incorporates a network/communication interface 108 and a notification system 110. Interface 108 facilitates communication over communications network 106. Notification system 110 receives information corresponding to a communication (e.g., a text-based communication) from another electronic device via the network/communication interface and provides a notification of an emotional tone of the communication to a user of electronic device 102.

Tone evaluation system 104, which may be remote from electronic device 102 (such as when hosted by a server), determines the emotional tone of the communication. Determining the emotional tone of a communication may involve analysis of one or more aspects of a communication, such as the presence of a key word or phrase, punctuation usage and use of capital letters, among possible others. In some embodiments, a tone evaluation system may incorporate a database for mapping various identified aspects to emotional tones. Additionally, the database may be correlated with senders of communications so that understandings of emotional tone may evolve. For instance, a default understanding of the use of all capital letters may be that the sender is angry. However, if it is noted that a sender often sends happy messages in all capital letters, the tone evaluation system may look to other aspects of the communication in order to determine an appropriate emotional tone.

It should be noted that, in some embodiments, information corresponding to the emotional tone of a communication may be associated with the communication prior to the communication being received. In such an embodiment, the electronic device receiving the communication and the associated information may interpret the information in order to provide the notification of the emotional tone. Such an embodiment will be described with respect to FIG. 6.

Figure 2:
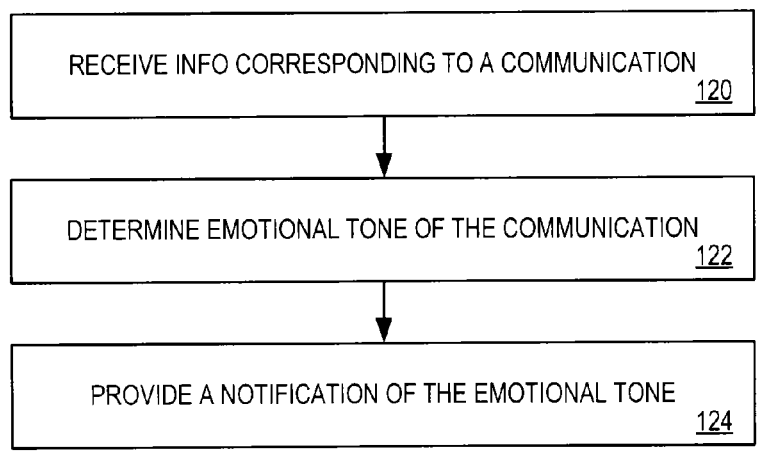
FIG. 2 is a flowchart depicting an example embodiment of a method for providing emotional tone-based notifications for communications.

FIG. 2 is a flowchart depicting an example embodiment of a method for providing emotional tone-based notifications for communications, such as may be performed by the system of FIG. 1. As shown in FIG. 2, the method involves receiving information corresponding to a communication (block 120). Specifically, the information is received by an electronic device, such as a mobile device (e.g., a smartphone). In block 122, the emotional tone (e.g., anger, excitement, fear, nervous, among possible others) of the communication is determined. Then, as depicted in block 124, a notification of the emotional tone is provided to the user of the electronic device. In some embodiments, the notification is provided without the need for user interaction with the device.

Figure 3:
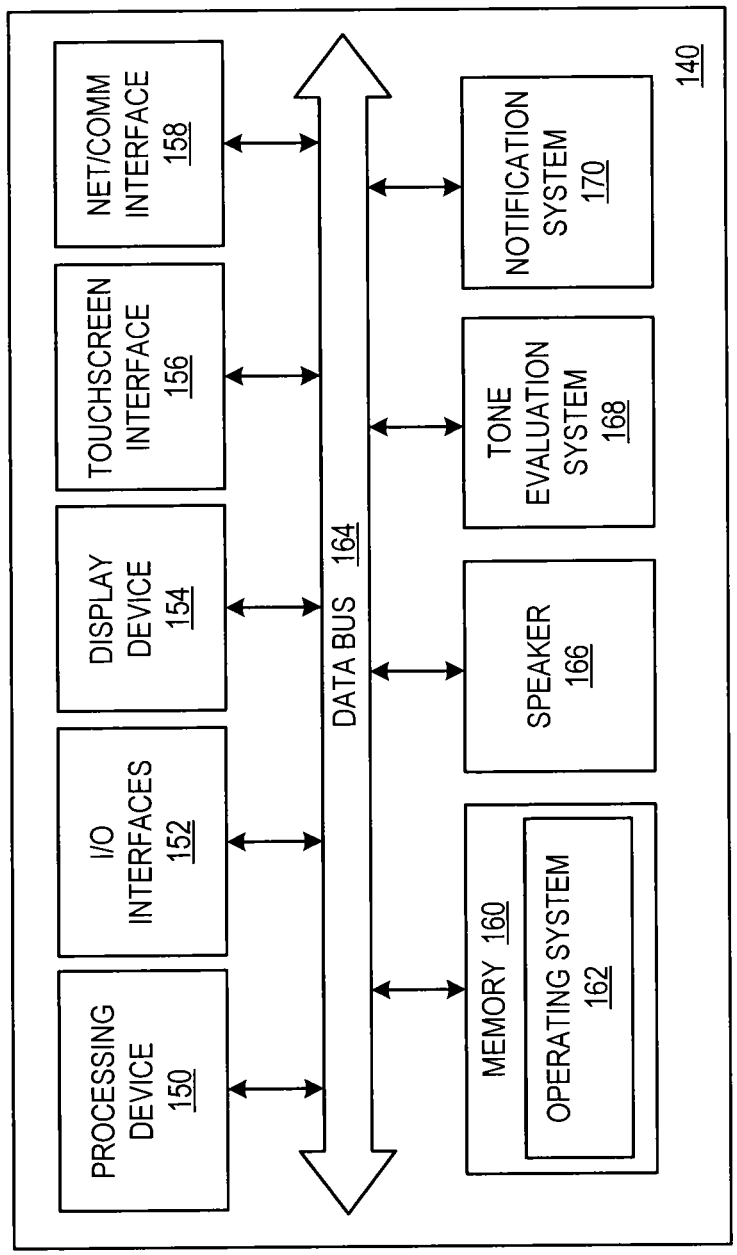
FIG. 3 is a schematic diagram of another example embodiment of a system for providing emotional tone-based notifications for communications.

FIG. 3 is a schematic diagram of another example embodiment of a system for providing emotional tone-based notifications for communications. In contrast to the embodiment of FIG. 1, in which the tone evaluation system is remote from the notification system, the tone evaluation system is resident in the electronic device.

As shown in FIG. 3, electronic device 140 includes a processing device (processor) 150, input/output interfaces 152, a display device 154, a touchscreen interface 156, a network/communication interface 158, a memory 160, and an operating system 162, with each communicating across a local data bus 164. Note that display device 154 may include an LCD type display (X pixel by Y pixel), backlighting or other lighting effects, or LED indicator lights, among possible others. Additionally, the system incorporates a speaker 166, a tone evaluation system 168 and a notification system 170.

The processing device 150 may include a custom made or commercially available processor, a central processing unit (CPU) or an auxiliary processor among several processors, a semiconductor based microprocessor (in the form of a microchip), one or more application specific integrated circuits (ASICs), a plurality of suitably configured digital logic gates, and other electrical configurations comprising discrete elements both individually and in various combinations to coordinate the overall operation of the system.

The memory 160 may include any or a combination of volatile memory elements (e.g., random-access memory (RAM, such as DRAM, and SRAM, etc.)) and nonvolatile memory elements. The memory typically comprises native operating system 152, one or more native applications, emulation systems, or emulated applications for any of a variety of operating systems and/or emulated hardware platforms, emulated operating systems, etc. For example, the applications may include application specific software which may comprise some or all the components of the system. In accordance with such embodiments, the components are stored in memory and executed by the processing device.

Touchscreen interface 156 is configured to detect contact within the display area of the display 154 and provides such functionality as on-screen buttons, menus, keyboards, soft keys, etc. that allows users to navigate user interfaces by touch.

One of ordinary skill in the art will appreciate that the memory may, and typically will, comprise other components which have been omitted for purposes of brevity. Note that in the context of this disclosure, a non-transitory computer-readable medium stores one or more programs for use by or in connection with an instruction execution system, apparatus, or device.

With further reference to FIG. 3, network/communication interface 158 comprises various components used to transmit and/or receive data over a networked environment. By way of example, such components may include a wireless communications interface. When such components are embodied as an application, the one or more components may be stored on a non-transitory computer-readable medium and executed by the processing device.

Tone evaluation system 168 receives information corresponding to a communication (such as via the notification system 170) and, responsive thereto, determines the emotional tone of the communication. In determining the emotional tone, one or more aspects of the communication are analyzed. In some embodiments, this may involve analyzing word/phrase content, punctuation usage and/or use of capital letters, among possible others.

Responsive to the determination of emotional tone of a communication, notification system 170 provides a notification of the emotional tone to the user of the electronic device. In particular, the notification system interacts with one or more output components of the device, such as the display device and/or speaker 166 to provide a notification. The form of notification may be used to identify the determined emotional tone such as in a manner similar to that in which a user selects a ringtone for identifying a caller.

Figure 4A:
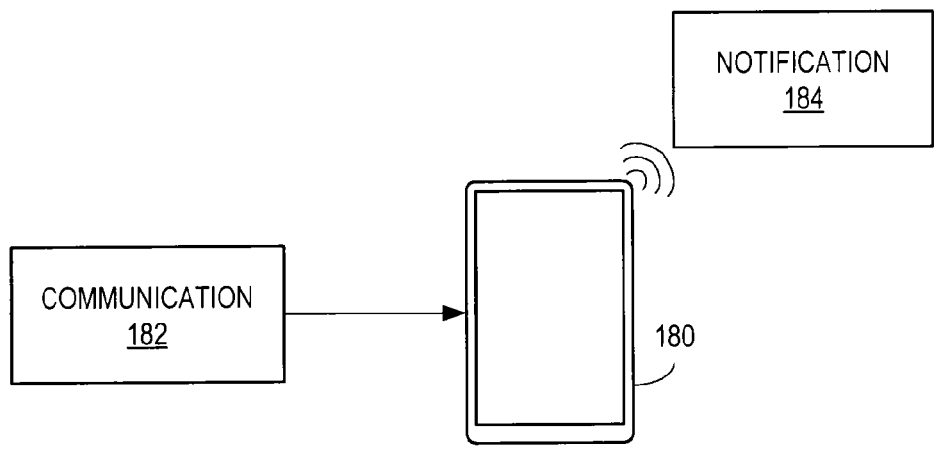
FIGS. 4A-4C are schematic diagrams depicting operation of another example embodiment of a system for providing emotional tone-based notifications for communications.
Figure 4B:
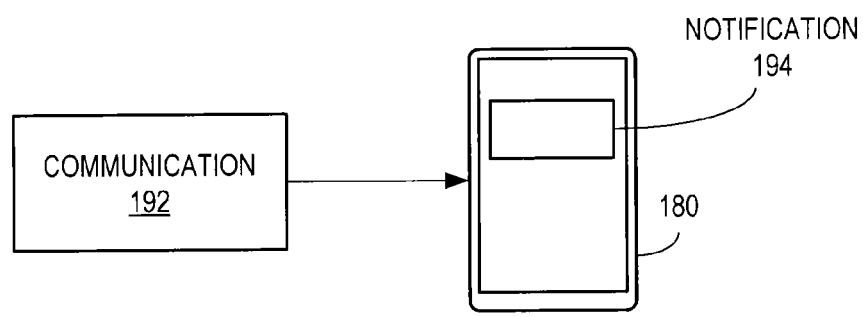
Figure 4C:
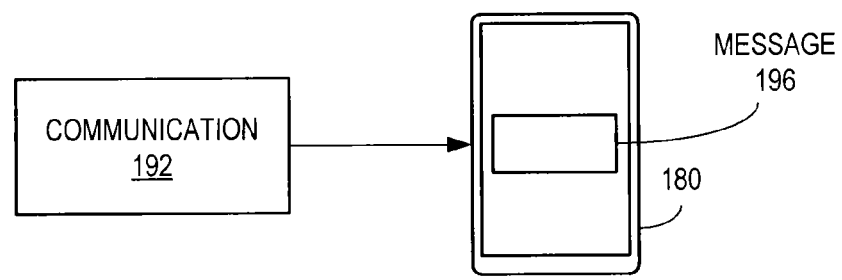

FIGS. 4A-4C are schematic diagrams depicting operation of another example embodiment of a system for providing emotional tone-based notifications for communications. As shown in FIG. 4A, an electronic device 180 (in this case, a mobile device) receives a communication 182 (e.g., a text-based communication). Responsive to the communication, an onboard tone evaluation system and notification system (both of which are not depicted) interact to provide a notification 184 representative of the emotional tone of the communication. In this scenario, notification 184 is provided as an aural notification via a speaker of the device.

In FIG. 4B, device 180 receives a communication 192. Responsive to this communication, which may be from the same sender as that for communication 182, a notification 194 representative of the emotional tone of the communication is provided. In this scenario, notification 194 is provided as a visual notification via a display of the device. Note that the notification is provided prior to the message, which is associated with the communication, is accessed by the user. Access to the associated message 196 is depicted in FIG. 4C.

Figure 5:
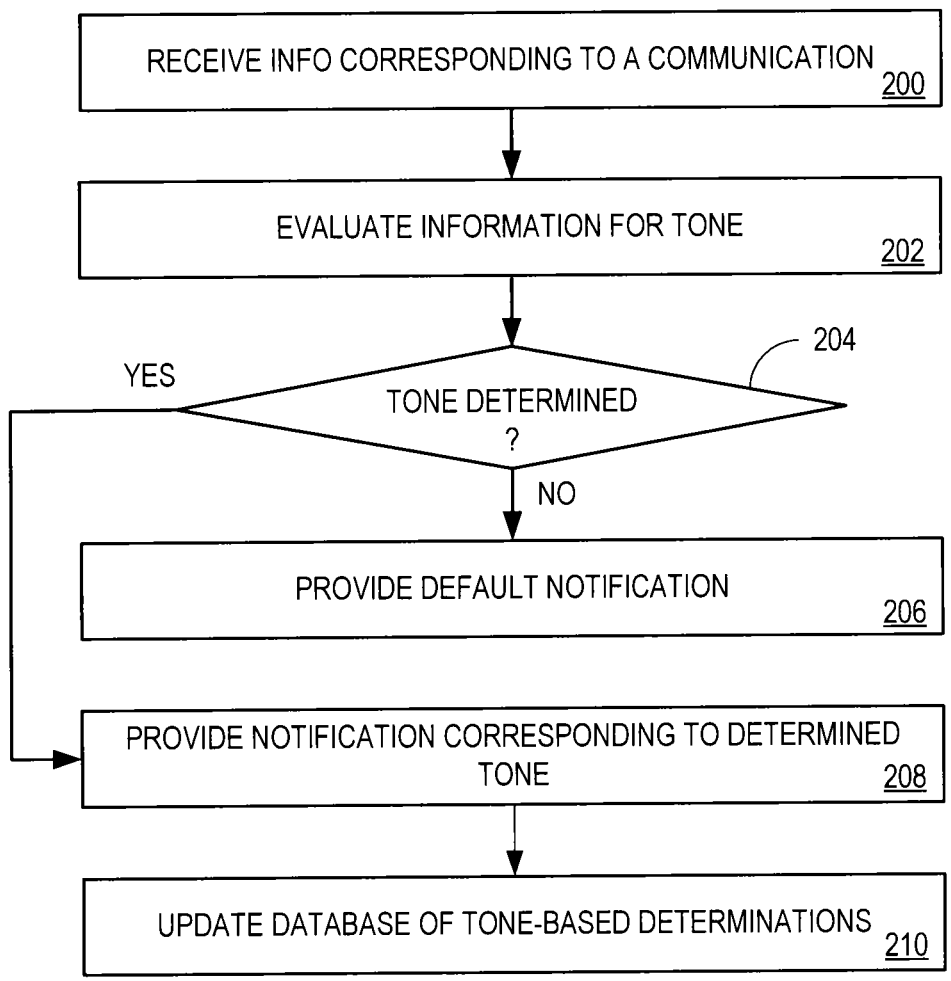
FIG. 5 is a flowchart depicting functionality that may be performed by another example embodiment of a method for providing emotional tone-based notifications for communications.

FIG. 5 is a flowchart depicting functionality that may be performed by an example embodiment of a system for providing emotional tone-based notifications for communications. As shown in FIG. 5, the functionality (or method) may be construed as beginning at block 200, in which information corresponding to a communication is received. In block 202, the information is evaluated to determine an emotional tone of the communication. Then, as depicted in block 204, a determination is made as to whether a tone has been determined. If an emotional tone is not determined, the process may proceed to block 206, in which a default notification may be provided. By way of example, a default notification may be a notification designated to identify the sender of the communication in some embodiments.

If, in block 204, an emotional tone is determined, the process may proceed to lock 208, in which a notification corresponding to the determined tone is provided. Specifically, by way of example, the notification may be provided visually, via haptic/vibration output and/or aurally to the user of the device. Thereafter, such as depicted in block 210, an associated database of tone-based determinations may be updated.

Figure 6:
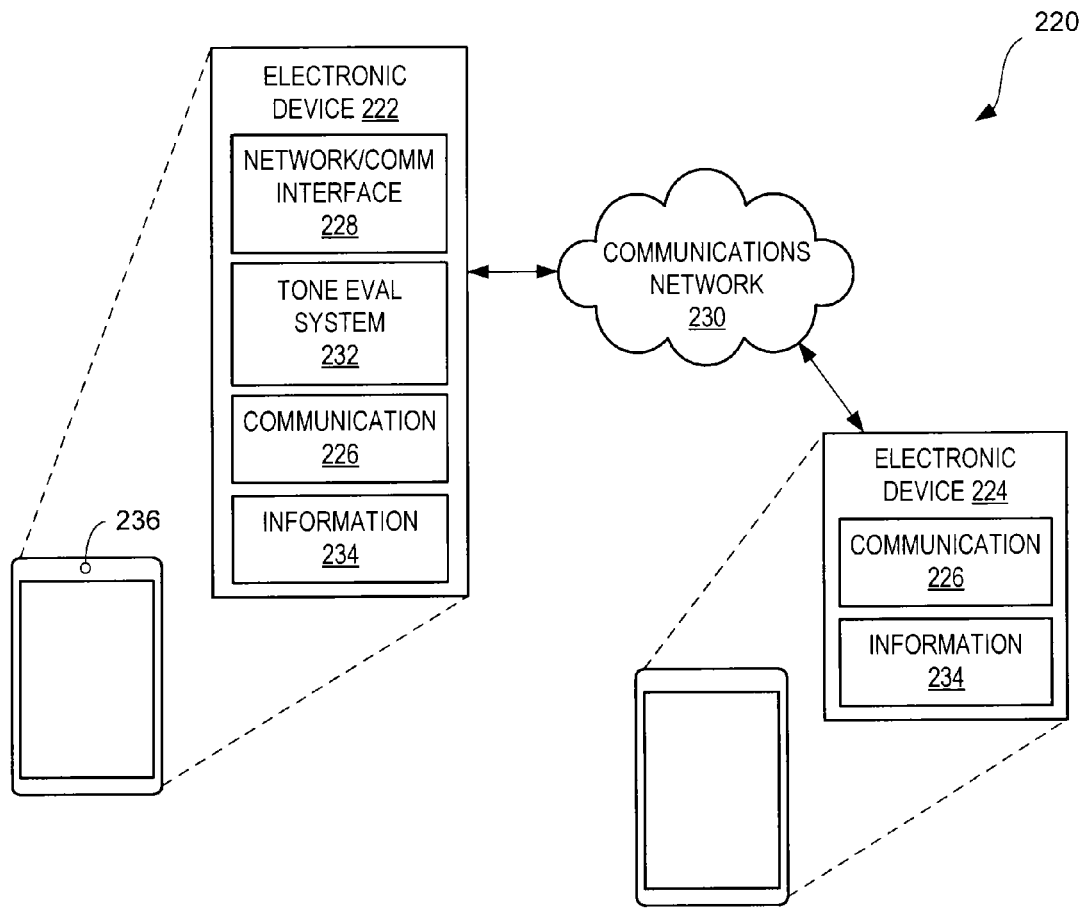
FIG. 6 is a schematic diagram of another example embodiment of a system for providing emotional tone-based notifications for communications.

FIG. 6 is a schematic diagram of another example embodiment of a system for providing emotional tone-based notifications for communications. As shown in FIG. 6, system 220 includes electronic devices 222 and 224. In this scenario, device 222 functions as a transmitting device for transmitting a communication 226, while device 224 functions as a receiving device for receiving the communication.

Electronic device 222 incorporates a network/communication interface 228 that enables the device to communicate via a communications network 230. Electronic device 222 also incorporates a tone evaluation system 232, which determines the emotional tone of a communication such as communication 226. Responsive to determining the emotional tone, information 234 corresponding to the emotional tone is associated with the communication. As such, the communication 226 and information 234 may be transmitted together, for example, for receipt by device 224.

In determining the emotional tone of a communication, one or more aspects may be analyzed. For instance, aspects of the communication itself, such as the presence of a key word or phrase, punctuation usage and use of capital letters, among possible others, may be analyzed. Additionally, or alternatively, a sensor (e.g., an accelerometer) may be used to measure how hard a user is typing, with significant accelerations being indicative of excitement or anger, for example. As another example, the device may measure how fast a user is typing and correlate the speed with an emotional tone.

By way of further example, facial recognition techniques may be used. Note that in the embodiment of FIG. 6, electronic device 222 incorporates a front-facing camera 236. Responsive to electronic device 222 receiving a user input corresponding to the generation of a communication (e.g., keyboard input), camera 236 may be actuated to capture image information associated with the face of the user. Subsequent analysis of the image information may enable the determination of the emotional state of the user, which may be indicative of the emotional tone of the communication. This information may be used as described before.

Figure 7:
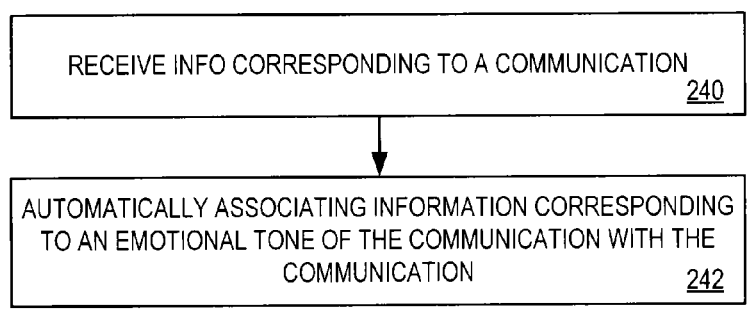
FIG. 7 is a flowchart depicting another example embodiment of a method for providing emotional tone-based notifications for communications.

FIG. 7 is a flowchart depicting another example embodiment of a method for providing emotional tone-based notifications for communications. As shown in FIG. 7, the method (which may be performed by the embodiment of FIG. 6, for example) involves receiving information at an electronic device corresponding to a communication (block 240). In block 242, information corresponding to an emotional tone of the communication is automatically associated with the communication. Notably, this may enable a recipient of the communication to be informed of the emotional tone.

If embodied in software, it should be noted that each block depicted in the flowchart of FIG. 5 (or any of the other flowcharts) represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

It should be emphasized that the above-described embodiments are merely examples of possible implementations. Many variations and modifications may be made to the above-described embodiments without departing from the principles of the present disclosure. By way of example, the systems described may be implemented in hardware, software or combinations thereof. All such modifications and variations are intended to be included herein within the scope of this disclosure and protected by the following claims.

At least the following is claimed:

1. A system for providing emotional tone-based notifications for communications comprising:
    an electronic device having a network/communication interface operative to facilitate communication over a networked environment, the electronic device further having:
    a camera and a tone evaluation system;
    the camera is operative to acquire image information corresponding to a user of the electronic device associated with user inputting information corresponding to a communication; and
    the tone evaluation system is operative to analyze the image information and determine an emotional tone of the communication based, at least in part, on the image information;
    the electronic device being operative to:
    receive input from a user for generating a communication; and
    automatically associate information corresponding to an emotional tone of the communication with the communication such that a recipient of the communication is informed of the emotional tone;
wherein the information corresponding to the emotional tone is not selected by the user of the electronic device.

2. The system of claim 1, wherein:
the system further comprises a tone evaluation system resident on a server, the server being operative to communicate with the electronic device via the networked environment; and
the tone evaluation system is operative to determine the emotional tone of the communication and to communicate information corresponding to the emotional tone to the electronic device.

3. The system of claim 1, wherein the electronic device is further operative to:
transmit the communication and the information corresponding to the emotional tone.

4. The system of claim 3, wherein:
the electronic device is a first electronic device;
the system further comprises a second electronic device operative to receive the communication; and
the second electronic device has a notification system operative to:
receive the information corresponding to the emotional tone; and
provide a notification of the emotional tone of the communication to a user of the second electronic device.

5. The system of claim 1, wherein:
the electronic device is a first electronic device; and
the system further comprises a second electronic device operative to receive the communication and provide a notification of the emotional tone to a user of the second electronic device.

6. The system of claim 5, wherein the second electronic device is operative to determine the emotional tone of the communication.

7. The system of claim 6, wherein:
the system further comprises a tone evaluation system resident on a server, the server being operative to communicate with the second electronic device via the networked environment; and
the tone evaluation system is operative to determine the emotional tone of the communication and to communicate information corresponding to the emotional tone to the second electronic device.

8. The system of claim 1, wherein the electronic device is a smartphone.

9. A non-transitory computer-readable memory having stored thereon computer-executable instructions for performing method steps comprising:
receiving information at an electronic device corresponding to a communication, the electronic device having:
a camera and a tone evaluation system;
the camera is operative to acquire image information corresponding to a user of the electronic device associated with user inputting information corresponding to a communication; and
the tone evaluation system is operative to analyze the image information and determine an emotional tone of the communication based, at least in part, on the image information; and
automatically associating information corresponding to an emotional tone of the communication with the communication such that a recipient of the communication is informed of the emotional tone;
wherein the information corresponding to the emotional tone is not selected by a sender of the communication.

10. The computer-readable memory of claim 9, further comprising determining the emotional tone of the communication.

11. The computer-readable memory of claim 9, wherein:
the communication is a text-based communication; and
determining the emotional tone of the communication further comprises analyzing the communication for at least one key word.

12. The computer-readable memory of claim 9, wherein:
the communication is a text-based communication; and
determining the emotional tone of the communication further comprises analyzing the communication for punctuation usage.

13. A method for providing emotional tone-based notifications for communications comprising:
receiving information at an electronic device corresponding to a communication, the electronic device having:
a camera and a tone evaluation system;
the camera is operative to acquire image information corresponding to a user of the electronic device associated with user inputting information corresponding to a communication; and
the tone evaluation system is operative to analyze the image information and determine an emotional tone of the communication based, at least in part, on the image information; and
automatically associating, via the electronic device, information corresponding to an emotional tone of the communication with the communication such that a recipient of the communication is informed of the emotional tone;
wherein the information corresponding to the emotional tone is not selected by a sender of the communication.

14. The method of claim 13, wherein:
the communication is a text-based communication; and
the method further comprises analyzing the communication for use of capital letters for determining the emotional tone of the communication.

15. The method of claim 14, wherein informing the recipient comprises providing a personalized notification to the recipient of the communication based on an identity of a sender of the communication.

16. The method of claim 15, wherein the personalized notification is provided via at least one of an auditory output, vibration/haptic output or a display output of the electronic device.

17. The method of claim 13, further comprising:
informing the recipient of the communication of the emotional tone; and
displaying the communication to the recipient via the electronic device.

18. The method of claim 13, wherein the communication is one of the group consisting of: a text message, an instant message, and an email message.

19. An electronic device for providing emotional tone-based notifications for communications comprising:
a network/communication interface operative to facilitate communication over a networked environment;
a camera and a tone evaluation system;
the camera is operative to acquire image information corresponding to a user of the electronic device associated with user inputting information corresponding to a communication; and
the tone evaluation system is operative to analyze the image information and determine an emotional tone of the communication based, at least in part, on the image information;

circuitry receiving input from a user for generating a communication; and circuitry configured to automatically associate information corresponding to an emotional tone of the communication with the communication such that a recipient of the communication is informed of the emotional tone;

wherein the information corresponding to the emotional tone is not selected by the user of the electronic device.

\* \* \* \* \*